(12) United States Patent
Lambert et al.

(10) Patent No.: US 11,755,834 B2
(45) Date of Patent: Sep. 12, 2023

(54) SELECTIVE TEXT PREDICTION FOR ELECTRONIC MESSAGING

(71) Applicant: Google LLC, Mountain View, CA (US)

(72) Inventors: Paul Roland Lambert, Redwood City, CA (US); Timothy Youngjin Sohn, Los Altos, CA (US); Jacqueline Amy Tsay, Sunnyvale, CA (US); Gagan Bansal, Sunnyvale, CA (US); Cole Austin Bevis, Lake Forest, IL (US); Kaushik Roy, Santa Clara, CA (US); Justin Tzi-jay Lu, Mountain View, CA (US); Katherine Anna Evans, Palo Alto, CA (US); Tobias Bosch, Santa Clara, CA (US); Yinan Wang, San Jose, CA (US); Matthew Vincent Dierker, Palo Alto, CA (US); Gregory Russell Bullock, Zürich (CH); Ettore Randazzo, Zürich (CH); Tobias Kaufmann, Zürich (CH); Yonghui Wu, Mountain View, CA (US); Benjamin N. Lee, Mountain View, CA (US); Xu Chen, San Francisco, CA (US); Brian Strope, Palo Alto, CA (US); Yun-hsuan Sung, Mountain View, CA (US); Do Kook Choe, Sunnyvale, CA (US); Rami Eid Sammouf Al-Rfou', Mountain View, CA (US)

(73) Assignee: Google LLC, Mountain View, CA (US)

(*) Notice: Subject to any disclaimer, the term of this patent is extended or adjusted under 35 U.S.C. 154(b) by 548 days.

(21) Appl. No.: 15/852,916

(22) Filed: Dec. 22, 2017

(65) Prior Publication Data
US 2019/0197101 A1 Jun. 27, 2019

(51) Int. Cl.
G06F 40/274 (2020.01)
G06F 3/04842 (2022.01)
G06N 20/00 (2019.01)
G06F 21/62 (2013.01)
(Continued)

(52) U.S. Cl.
CPC .......... G06F 40/274 (2020.01); G06F 3/0237 (2013.01); G06F 3/04842 (2013.01);
(Continued)

(58) Field of Classification Search
CPC .... G06F 17/22; G06F 17/2264; G06F 17/276; G06F 21/6254
See application file for complete search history.

(56) References Cited

U.S. PATENT DOCUMENTS 8,370,143 B1* 2/2013 Coker ................... G06F 40/232
704/240
2005/0154692 A1* 7/2005 Jacobsen ............. G06F 17/2264
706/47
(Continued)

FOREIGN PATENT DOCUMENTS

EP 3174047 A1 5/2017
GB 2470585 A 1/2010

OTHER PUBLICATIONS

International Search Report & Written Opinion from counterpart International Application No. PCT/US2018/059239, dated Jan. 30, 2019, 16 pp.
(Continued)

*Primary Examiner* — Thomas H Maung
(74) *Attorney, Agent, or Firm* — Shumaker & Sieffert, P.A.

(57) ABSTRACT

A computing system is described that includes user interface components configured to receive typed user input; and one or more processors. The one or more processors are configured to: receive, by a computing system and at a first time,
(Continued)

a first portion of text typed by a user in an electronic message being edited; predict, based on the first portion of text, a first candidate portion of text to follow the first portion of text; output, for display, the predicted first candidate portion of text for optional selection to append to the first portion of text; determine, at a second time that is after the first time, that the electronic message is directed to a sensitive topic; and responsive to determining that the electronic message is directed to a sensitive topic, refrain from outputting subsequent candidate portions of text for optional selection to append to text in the electronic message.

15 Claims, 4 Drawing Sheets

(51) Int. Cl.
    *G06F 3/023*      (2006.01)
    *G06F 40/30*      (2020.01)
    *G06F 40/232*      (2020.01)
    *G06F 40/253*      (2020.01)
    *G06F 40/284*      (2020.01)

(52) U.S. Cl.
    CPC ........ *G06F 21/6245* (2013.01); *G06F 40/232* (2020.01); *G06F 40/253* (2020.01); *G06F 40/284* (2020.01); *G06F 40/30* (2020.01); *G06N 20/00* (2019.01)

(56) References Cited

U.S. PATENT DOCUMENTS

| | | | |
|---|---|---|---|
| 2011/0087961 | A1 | 4/2011 | Fitusi et al. |
| 2011/0246575 | A1* | 10/2011 | Murayama .............. G06F 16/93 |
| | | | 709/204 |
| 2013/0289977 | A1* | 10/2013 | Tanaka ................ G06F 17/2264 |
| | | | 704/9 |
| 2014/0163954 | A1 | 6/2014 | Abhijit et al. |
| 2016/0306800 | A1 | 10/2016 | Son et al. |
| 2017/0201471 | A1 | 7/2017 | Miklos et al. |
| 2017/0318061 | A1* | 11/2017 | Zha .................... G06F 16/9537 |
| 2018/0089588 | A1 | 3/2018 | Ravi et al. |

OTHER PUBLICATIONS

Brown et al., "Class-Based n-gram Models of Natural Language," vol. 18, No. 4, 1992, 13 pp. (Applicant points out, in accordance with MPEP 609.04(a), that the year of publication, 1992, is sufficiently earlier than the effective U.S. filing date, so that the particular month of publication is not in issue.).

International Preliminary Report on Patentability from International Application No. PCT/US2018/059239, dated Jul. 2, 2020, 9 pp.

\* cited by examiner

SELECTIVE TEXT PREDICTION FOR ELECTRONIC MESSAGING

BACKGROUND

Some computing systems provide electronic messaging (e.g., e-mail) services that facilitate quick and easy communication between users of computing devices. Drafting and otherwise editing electronic messages can be cumbersome and take a lot of time, which may result in reduced use of electronic messages and/or inefficient communication of information.

SUMMARY

In general techniques of this disclosure are directed to enabling selective text prediction for editing electronic messages. An example computing system (such as an e-mail system) is described that is configured to provide suggested text to a user that is editing an electronic message. For instance, after the user has typed some text of a sentence (e.g., "What are you"), the computing system may predict and offer candidate text to follow the text typed by the user (e.g., "doing tonight."). The computing system may predict the candidate text based on a corpus of text (e.g., the computing system may utilize one or more machine learning models trained on the corpus of text). While the predictions may generally be helpful and accurate (e.g., the predicted text is close to what the user would have otherwise typed), there may be some scenarios where it is not desirable for the computing system to provide the predictions. For instance, where the electronic message is directed to a sensitive topic, it may be desirable for the computing system to refrain from presenting the user with predicted text so as to avoid suggesting text that the user may consider offensive or inappropriate.

In one example, a method includes receiving, by a computing system and at a first time, a first portion of text of an electronic message being edited; predicting, by the computing system and based on the first portion of text, a first candidate portion of text to follow the first portion of text; outputting, for display, the predicted first candidate portion of text for optional selection to append to the first portion of text; determining, by the computing system and at a second time that is after the first time, that the electronic message is directed to a sensitive topic; and responsive to determining that the electronic message is directed to a sensitive topic, refraining from outputting subsequent candidate portions of text for optional selection to append to text in the electronic message.

In another example, a computing system includes one or more user interface components configured to receive typed user input; and one or more processors. In this example, the one or more processors are configured to: receive, by a computing system and at a first time, a first portion of text typed by a user in an electronic message being edited; predict, based on the first portion of text, a first candidate portion of text to follow the first portion of text; output, for display, the predicted first candidate portion of text for optional selection to append to the first portion of text; determine, at a second time that is after the first time, that the electronic message is directed to a sensitive topic; and responsive to determining that the electronic message is directed to a sensitive topic, refrain from outputting subsequent candidate portions of text for optional selection to append to text in the electronic message.

In another example, a computer-readable storage medium is described that includes instructions, that when executed, cause at least one processor of a computing system to receive, at a first time, a first portion of text of an electronic message being edited; predict, based on the first portion of text, a first candidate portion of text to follow the first portion of text; output, for display, the predicted first candidate portion of text for optional selection to append to the first portion of text; determine, at a second time that is after the first time, that the electronic message is directed to a sensitive topic; and responsive to determining that the electronic message is directed to a sensitive topic, refrain from outputting subsequent candidate portions of text for optional selection to append to text in the electronic message.

In another example, a system is described that includes means for receiving, at a first time, a first portion of text of an electronic message being edited; means for predicting, based on the first portion of text, a first candidate portion of text to follow the first portion of text; means for outputting, for display, the predicted first candidate portion of text for optional selection to append to the first portion of text; means for determining, at a second time that is after the first time, that the electronic message is directed to a sensitive topic; and means for refraining, in response to determining that the electronic message is directed to a sensitive topic, from outputting subsequent candidate portions of text for optional selection to append to text in the electronic message.

Throughout the disclosure, examples are described wherein a computing device and/or computing system may analyze information (e.g., e-mail, other communications, and the like) associated with the computing device the user of the computing device only if the computing device and/or the computing system receives explicit permission from the user of the computing device to analyze the information. For example, in situations discussed below in which the computing device and/or computing system may collect or may make use of communication information associated with the user and the computing device, the user may be provided with an opportunity to provide input to control whether programs or features of the computing device and/or computing system can collect and make use of user information (e.g., information about a user's e-mail, a user's social network, social actions or activities, profession, a user's preferences, or a user's past and current location), or to dictate whether and/or how the computing device and/or computing system may receive content that may be relevant to the user. In addition, certain data may be treated in one or more ways before it is stored or used by the computing device and/or computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device and/or computing system.

The details of one or more examples are set forth in the accompanying drawings and the description below. Other features, objects, and advantages of the disclosure will be apparent from the description and drawings, and from the claims.

DETAILED DESCRIPTION

Figure 1A:
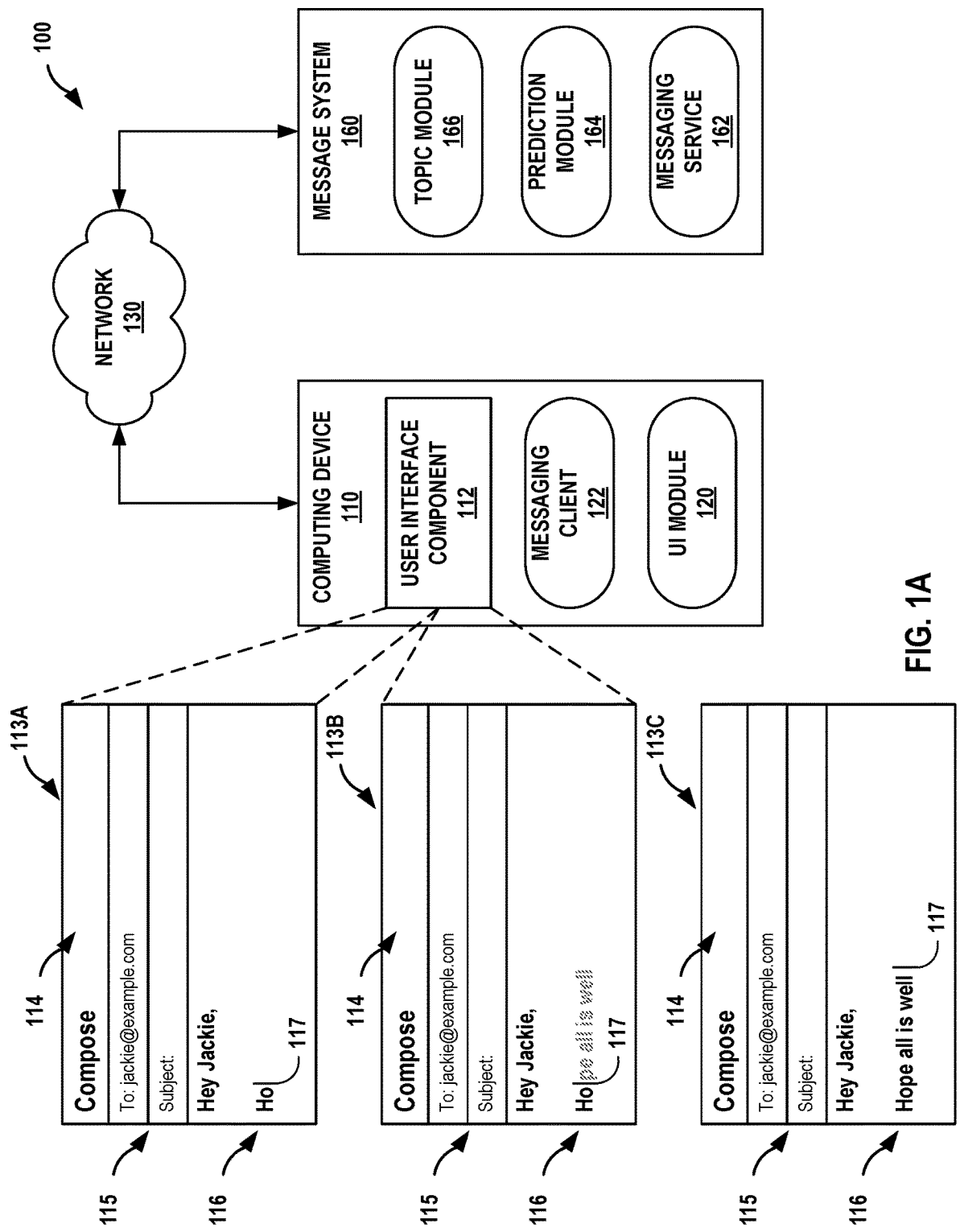
FIG. 1A is a conceptual diagram illustrating an example communication system configured to selectively provide predicted text suggestions to a user editing an electronic message, in accordance with one or more aspects of the present disclosure.
Figure 1B:
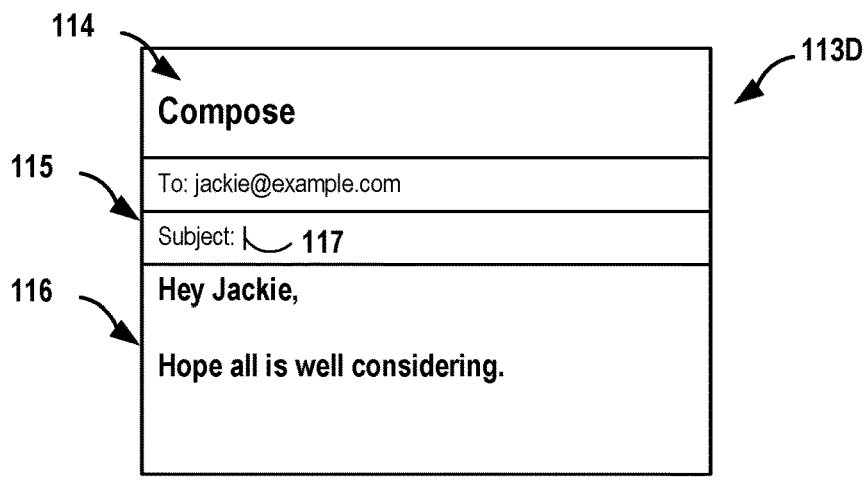
FIG. 1B is a conceptual diagram illustrating example user interfaces for electronic message editing, in accordance with one or more aspects of the present disclosure.
Figure 1B:
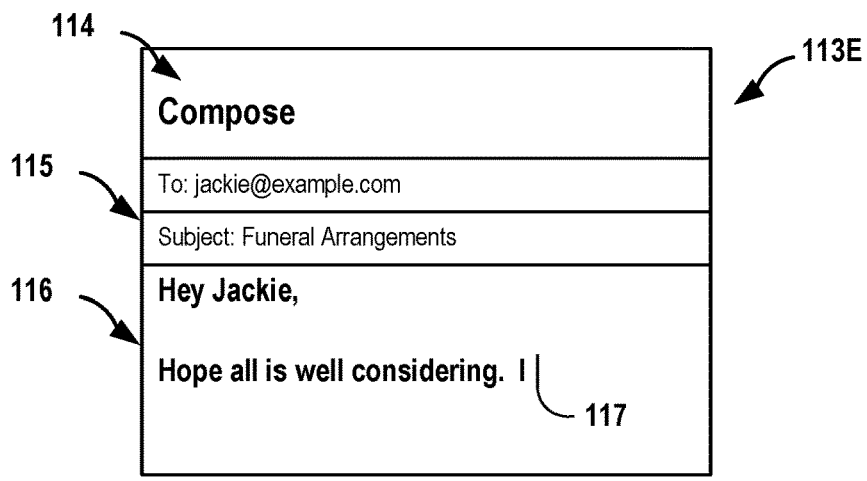
Figure 1B:
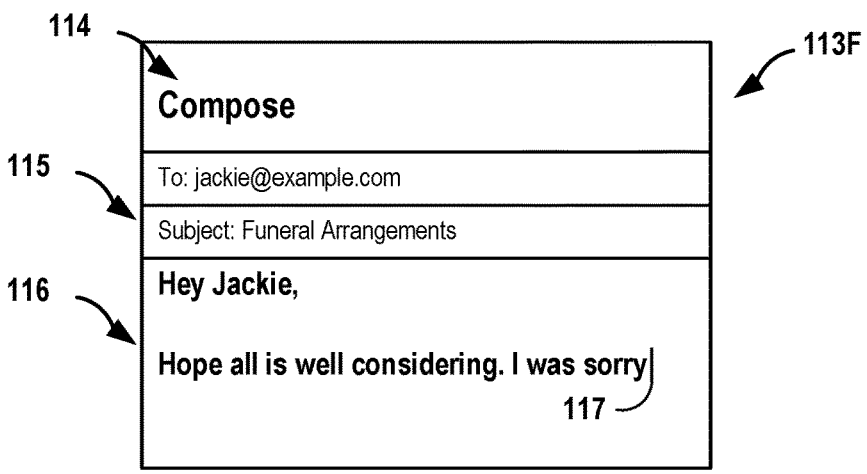

FIG. 1A is a conceptual diagram illustrating an example communication system configured to selectively provide predicted text suggestions to a user editing an electronic message, in accordance with one or more aspects of the present disclosure. FIG. 1B is a conceptual diagram illustrating example user interfaces for electronic message editing, in accordance with one or more aspects of the present disclosure. System 100 of FIG. 1A includes message system 160 in communication, via network 130, with computing device 110. Although system 100 is shown as being distributed amongst message system 160 and computing device 110, in other examples, the features and techniques attributed to system 100 may be performed internally, by local components of computing device 110.

Network 130 represents any public or private communications network, for instance, cellular, Wi-Fi, and/or other types of networks, for transmitting data between computing systems, servers, and computing devices. Message system 160 may exchange data, via network 130, with computing device 110 to provide a messaging service that is accessible to computing device 110 when computing device 110 is connected to network 130. Network 130 may include one or more network hubs, network switches, network routers, or any other network equipment, that are operatively intercoupled thereby providing for the exchange of information between message system 160 and computing device 110. Computing device 110 and message system 160 may transmit and receive data across network 130 using any suitable communication techniques. Computing device 110 and message system 160 may each be operatively coupled to network 130 using respective network links. The links coupling computing device 110 and message system 160 to network 130 may be Ethernet or other types of network connections and such connections may be wireless and/or wired connections.

Message system 160 represents any suitable remote computing system, such as one or more desktop computers, laptop computers, mainframes, servers, cloud computing systems, etc., that is configured to hosting an electronic messaging service. For example, messaging system 160 may be one or more mail servers configured to provide an e-mail messaging service. Computing device 110 represents an individual mobile or non-mobile computing device that is configured to access the messaging service provided by message system 160. Examples of computing device 110 include a mobile phone, a tablet computer, a laptop computer, a desktop computer, a server, a mainframe, a set-top box, a television, a wearable device (e.g., a computerized watch, computerized eyewear, computerized gloves, etc.), a home automation device or system (e.g., an intelligent thermostat or security system), a voice-interface or countertop home assistant device, a personal digital assistants (PDA), a gaming system, a media player, an e-book reader, a mobile television platform, an automobile navigation or infotainment system, or any other type of mobile, non-mobile, wearable, and non-wearable computing device configured to access an electronic messaging service.

Message system 160 includes topic module 166, prediction module 164 and messaging service module 162; computing device 110 includes user interface component ("UIC") 112, user interface ("UI") module 120, and messaging client module 122. Modules 120, 122, 162, 164, and 166 may perform operations described herein using software, hardware, firmware, or a mixture of hardware, software, and firmware residing in and/or executing at computing device 110. Computing device 110 and message system 160 may execute modules 120, 122, 162, 164, and 166 with multiple processors or multiple devices, as virtual machines executing on underlying hardware, as one or more services of an operating system or computing platform, and/or as one or more executable programs at an application layer of a computing platform of computing device 110 or message system 160.

UIC 112 of computing device 110 functions as an input and/or output device for computing device 110. UIC 112 may be implemented using various technologies. For instance, UIC 112 may function as an input device using presence-sensitive input screens, microphone technologies, infrared sensor technologies, or other input device technology for use in receiving user input. UIC 112 may function as output device configured to present output to a user using any one or more display devices, speaker technologies, haptic feedback technologies, or other output device technology for use in outputting information to a user. As an input device, UIC 112 detects input (e.g., touch and non-touch input) from a user of computing device 110. Examples of user input gestures performed by a user (e.g., the user touching, pointing, and/or swiping at or near one or more locations of UIC 112 with a finger or a stylus pen). As an output device, UIC 112 presents information (e.g., audible, visual, and/or haptic information) to a user in the form of a graphical user interface.

UI module 120 of computing device 110 controls UIC 112 including determining what UIC 112 presents and what information is exchanged between UIC 112 and other applications or components of computing device 110. For example, in controlling what UIC 112 displays, UI module 120 may receive information from a component of computing device 110, such as messaging client module 122, for generating user interface 113 and elements thereof. In response, UI module 120 may output instructions and information to UIC 112 that cause UIC 112 to display a user interface of user interfaces 113 according to the information received from messaging client module 122. When handling input detected by UIC 112, UI module 120 may receive information from UIC 112 in response to inputs detected at locations of a screen of UIC 112 at which elements of user interface 113 are displayed. UI module 120 disseminates information about inputs detected by UIC 112 to other components of computing device 110 for interpreting the inputs and for causing computing device 110 to perform one or more functions in response to the inputs.

User interfaces 113A-113F (collectively, "user interfaces 113") represent graphical user interfaces from which a user of computing device 110 can interact with a messaging service accessed by computing device 110, such as the messaging service provided by message system 160. As illustrated in FIGS. 1A and 1B, user interfaces 113 each include a view of a message currently bring composed.

Messaging client module 122 and messaging service module 162 communicate via network 130 to provide a messaging service to computing device 110. Examples of a messaging service include: e-mail service, text messaging service, simple service messaging, social media messaging service, voice message service, video message service, or any other service that facilitates the exchange of human-readable electronic messages. As used throughout the disclosure, the term "electronic message" is used to generally describe any type of human-readable electronic message that might be transmitted between computing devices. Examples of electronic messages include: instant messages, chat messages, electronic mail (e-mail) messages, social media communications, voicemail messages, video messages, or any other type of person-to-person communication that is accessed via a computing device.

Messaging client module 122 provides the front-end, user facing features of the messaging service whereas messaging service module 162 supports the back-end operations needed to implement the messaging service on network 130. Messaging client module 122 may function as a portal from which computing device 110 accesses electronic messages stored at message system 160 and/or at computing device 110. Messaging client module 122 may provide an editing interface via which a user may compose new electronic messages and/or reply or forward electronic messages stored at message system 160 and/or at computing device 110. Composing new electronic messages, replaying to electronic messages, and forwarding electronic messages may collectively be considered to be editing electronic messages. Messaging client module 122 may be an e-mail application, web application, or other module executing at computing device 110 that communicates with message system 160 to provide a user of computing device 110 with access to messages maintained at message system 160 and/or computing device 110.

Messaging service module 162 processes electronic messages received via network 130 from computing device 110 as well as other computing devices and messaging systems that are communicating via network 130. Messaging client module 122 processes inbound electronic messages received via network 130 from message system 160 and sends, via network 130, outbound electronic messages to messaging service module 162 for further processing.

Messaging client module 122 and messaging service module 162 maintain a messaging account associated with a user of computing device 110. That is, messages sent from or received by computing device 110 may be stored in a sent box or an inbox of a messaging account associated with a user of computing device 110. The sent box and inbox may be maintained in memory of computing device 110 and/or message system 160.

In a simple case when handling an inbound message that is destined for computing device 110, messaging service module 162 receives (e.g., via network 130) an electronic message for processing. Messaging service module 162 determines (e.g., from metadata of the electronic message) one or more recipients of the electronic message. If one of the recipients is a messaging account associated with the user of computing device 110, messaging service module 162 may cause a copy of the electronic message to be stored in an inbox of the messaging account associated with the user of computing device 110, whether that messaging account is stored locally at messaging system 160 or computing device 110.

Likewise, when handling an outbound message that originated from computing device 110, messaging service module 162 receives (e.g., via network 130) an electronic message for processing. Messaging service module 162 determines (e.g., from metadata of the electronic message) one or more recipients of the electronic message and sends the message to devices or message systems associated with the one or more recipients. Messaging service module 162 may cause a copy of the electronic message being sent to be stored as a sent item in the messaging account associated with the user of computing device 110, whether that messaging account is stored locally at messaging system 160 or computing device 110.

As discussed above, messaging client module 122 may provide an editing interface via which a user may edit electronic messages. For instance, to enable editing of electronic message 114, messaging client module 122 may output user interface 113A that includes one or more of: header fields 115 and message body 116. Header fields 115 may include address fields (e.g., to, cc, bcc, etc.), and a subject line. Messaging client module 122 may interact with one or more other components of system 100 to assist a user with electronic message editing. For instance, messaging client module 122 may interact with prediction module 164 to automatically provide text suggestions during electronic message editing. As shown in user interface 113A where "jackie@example.com" has been filled in a to field of header fields 115 and the user has typed "Hey Jackie, Ho", messaging client module 122 may interact with prediction module 164 to automatically provide text suggestions to be inserted after cursor 117 (i.e., inserted after the point at which the user is currently editing electronic message 114).

Prediction module 164 of message system 160 is configured to automatically provide text suggestions during electronic message editing. Although shown as part of message system 160, in some examples, some or all of prediction module 164 executes as part of computing device 110 where prediction module 164 is configured to automatically provide text suggestions during electronic message editing.

To provide the text suggestions, prediction module 164 may receive at least a portion of text from an electronic message being edited. The portion of text may include text of a sentence currently being edited, a number of characters (e.g., 5, 10, 15, 20, 50, etc.) that immediately proceed a cursor (e.g., a flashing or static line in the electronic message where typed characters will be inserted), a number of words (e.g., 1, 2, 3, 4, 5, 10, 15, 20, etc.) that immediately proceed the cursor, the entirety of the electronic message being edited, or any other portion of the electronic message being edited (either including or not including headers such as address and subject information).

Based on the received portion of text, prediction module 164 may predict one or more candidate portions of text to insert at the cursor (i.e., to follow the received portion of text). Prediction module 164 may predict the candidate portions of text using any number of techniques. For instance, prediction module 164 may utilize one or more machine learning models to generate the one or more candidate portions of text. In the example of FIG. 1, based on the text "Ho", prediction module 164 may generate the following candidate portions of text, including base portion Ho: "Hope all is well.", "How are you doing?", "Hope that you", "Home address: 4378 Ventura Ave, Sunnyvale, Calif.".

Prediction module 164 may determine a ranking score or other indication of accuracy or confidence for the candidate portions. In the example of FIGS. 1A and 1B, prediction module 164 may determine that "Hope all is well" is the highest ranked/most likely to be accurate of the candidate portions of text.

Prediction module 164 may output the one or more candidate portions of text to one or more other components of system 100, such as messaging client 122 or UIC 112. In some examples, prediction module 164 may output all of the candidate portions of text. In some examples, prediction module 164 may output fewer than all of the candidate portions of text. For instance, prediction module 164 may only output the N (e.g., 1, 2, 3, 4, 5, etc.) highest ranked/most likely to be accurate portions of text.

Messaging client 122 may output at least one of the one or more candidate portions of text for display to the user. For instance, messaging client 122 may cause UIC 112 to output a user interface that includes the at least one candidate portion of text. As shown in FIG. 1A, UIC 112 may output user interface 113B that includes the highest ranked/most likely to be accurate candidate portion of text "pe all is well". In some examples, messaging client 122 may output the candidate portions of text after cursor 117. The formatting of the displayed candidate portions of text may be the same or different than the previously entered text. For instance, as shown in the example of FIG. 1A, the candidate portion of text (without base portion Ho) is displayed in a lighter weight type (e.g., 50% gray) whereas the previously entered text is displayed in heavier weight type (e.g., black). Other formatting differences, such as bold, italics, underline, font size, etc., are contemplated.

The user of computing device 110 can accept or reject the displayed suggestion. For instance, the user may provide first user input at UIC 112 (e.g., hitting the enter key) to accept the displayed suggestion. Alternatively, the user may provide second user input at UIC 112 (e.g., by continuing to type without providing the first user input) to reject the displayed suggestions.

Responsive to receiving an indication of the first user input, messaging client 122 may cause UIC 112 to output a user interface with the displayed candidate portion of text appended. For instance, messaging client 122 may cause UIC 112 to output user interface 113C that shows candidate portion of text "pe all is well" appended at the previous position of cursor 117 (i.e., the position of cursor 117 in user interface 113B).

In this example, after the user provided input to accept the suggestion of "pe all is well", the user may type the word "considering" as shown in user interface 113D of FIG. 1B. The user may also complete the subject line of header fields 115 by typing "Funeral Arrangements" as shown in user interface 113E of FIG. 1B.

While the predictions provided by prediction module 164 may generally be helpful and accurate (e.g., the predicted text is close to what the user would have otherwise typed), there may be some scenarios where it is not desirable system 100 to output predicted text. For instance, where the electronic message is directed to a sensitive topic, the user of computing device 110 may consider some text suggestions to be offensive or inappropriate.

In accordance with one or more techniques of this disclosure, system 100 may selectively refrain from outputting text suggestions in electronic messages that are directed to a sensitive topic. Some example sensitive topics include, but are not limited to, deaths, funerals, crimes, job losses, job rejections, academic rejections, and the like.

Topic module 166 may determine whether an electronic message is directed to a sensitive topic based on the content of the electronic message. As one example, topic module 166 may determine that an electronic message is directed to a sensitive topic where the electronic message includes one or more words or phrases from a sensitive topic database. As another example, topic module 166 may utilize one or more machine learning models to determine whether or not an electronic message is directed to a sensitive topic. In the example of FIG. 1B, topic module 166 may determine that electronic message 114 is directed to a sensitive topic based on the word "funeral" being included in a sensitive topic database.

In response to determining that electronic message 114 is directed to a sensitive topic, topic module 166 may cause prediction module 164 to refrain from predicting subsequent candidate text suggestions and/or messaging client 122 may refrain from outputting subsequent candidate text suggestions. For instance, as shown in FIG. 1B, user interfaces 113E and 113F, even though the user is typing "I" and then "was sorry", no candidate text suggestions are displayed.

By providing suggested text by default but refraining from providing suggested text when a message is directed to a sensitive topic, an example computing system may improve usability of a messaging service. Such automation may promote more efficient user interactions with the example computing system thereby causing the example computing system to receive fewer false inputs or fewer inputs in general than other computing systems that do not selectively provide text suggestions in this way. The example computing system may therefore perform fewer operations (or, in other words, utilize fewer processor cycles) and may consume less electrical power and/or result in battery power savings, as compared to other computing systems. In addition, the example computing system may provide a less frustrating and more enjoyable user experience.

Throughout the disclosure, examples are described wherein a computing device and/or computing system may analyze information (e.g., e-mail, other communications, and the like) associated with the computing device the user of the computing device only if the computing device and/or the computing system receives explicit permission from the user of the computing device to analyze the information. For example, in situations discussed below in which the computing device and/or computing system may collect or may make use of communication information associated with the user and the computing device, the user may be provided with an opportunity to provide input to control whether programs or features of the computing device and/or computing system can collect and make use of user information (e.g., information about a user's e-mail, a user's social network, social actions or activities, profession, a user's preferences, or a user's past and current location), or to dictate whether and/or how the computing device and/or computing system may receive content that may be relevant to the user. In addition, certain data may be treated in one or more ways before it is stored or used by the computing device and/or computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device and/or computing system.

Figure 2:
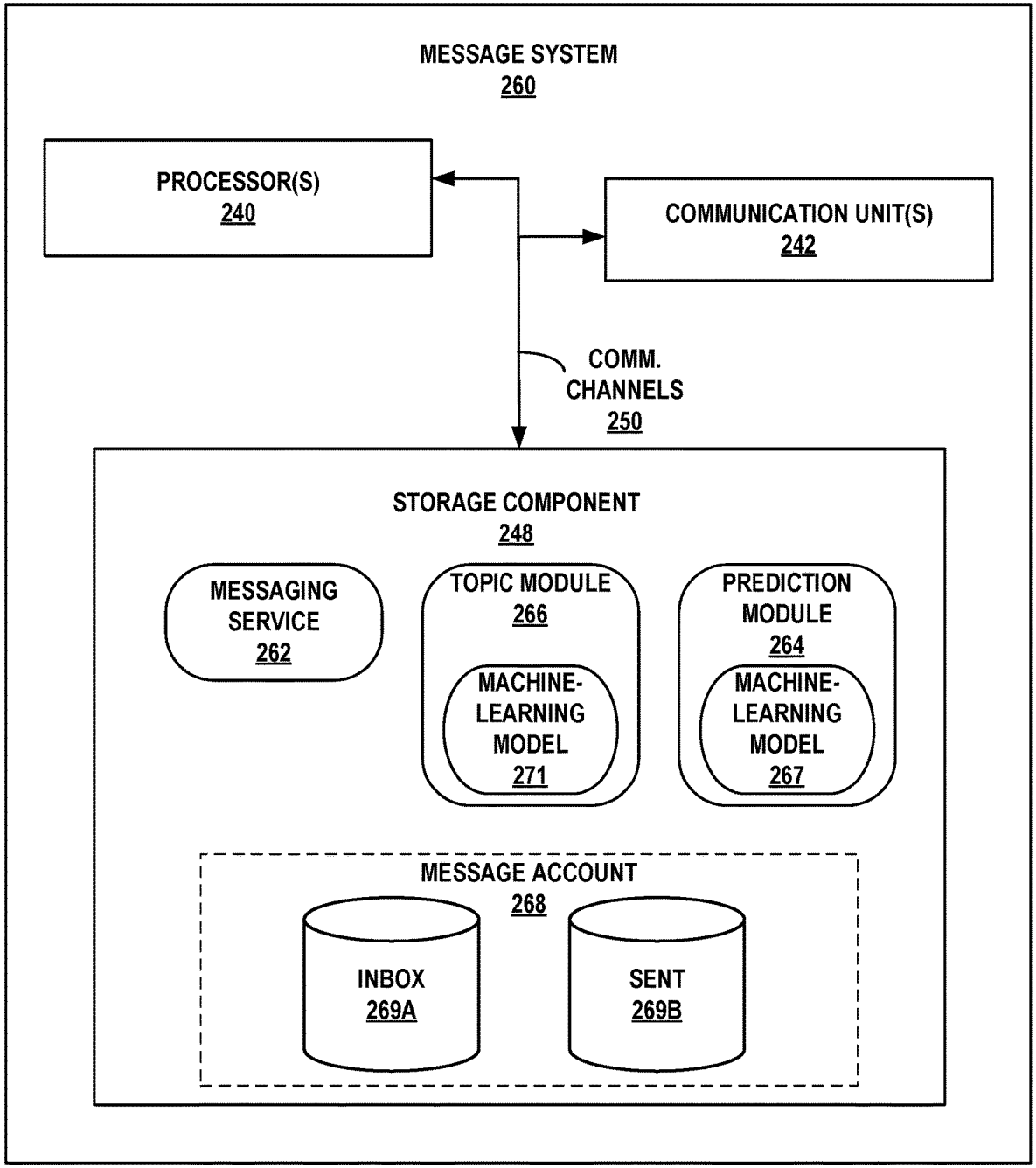
FIG. 2 is a block diagram illustrating an example computing system that is configured to selectively provide predicted text suggestions to a user editing an electronic message, in accordance with one or more aspects of the present disclosure.

FIG. 2 is a block diagram illustrating an example computing system that is configured to selectively provide predicted text suggestions to a user editing an electronic message, in accordance with one or more aspects of the present disclosure Message system 260 of FIG. 2 is described below as an example of message system 160 of FIG. 1A. FIG. 2 illustrates only one particular example of message system 260, and many other examples of message system 260 may be used in other instances and may include a subset of the components included in message system 260 or may include additional components not shown in FIG. 2.

As shown in the example of FIG. 2, message system 260 include one or more processors 240, one or more communication units 242, and one or more storage components 248. Storage components 248 of message system 260 includes messaging service module 262, prediction module 264, topic module 266, and message account 268 which includes inbox 269A and sent box 269B. Prediction module 264 includes machine-learning (ML) model 267. Topic module 266 includes ML model 271.

Communication channels 250 interconnect each of the components 240, 242, and 248 for inter-component communications (physically, communicatively, and/or operatively). In some examples, communication channels 250 may include a system bus, a network connection, an inter-process communication data structure, or any other method for communicating data.

One or more communication units 242 communicate with external devices via one or more wired and/or wireless networks by transmitting and/or receiving network signals on the one or more networks. Examples of communication units 242 include a network interface card (e.g. such as an Ethernet card), an optical transceiver, a radio frequency transceiver, a GPS receiver, or any other type of device that can send and/or receive information. Other examples of communication units 242 may include short wave radios, cellular data radios, wireless network radios, as well as universal serial bus (USB) controllers.

One or more storage components 248 store information for processing during operation of message system 260. In some examples, storage component 248 is a temporary memory, meaning that a primary purpose of storage component 248 is not long-term storage. Storage components 248 on message system 260 may be configured for short-term storage of information as volatile memory and therefore not retain stored contents if powered off. Examples of volatile memories include random access memories (RAM), dynamic random-access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories.

Storage components 248 may store program instructions and/or information (e.g., data) associated with message account 268, modules 262-266, and ML models 267 and 271. Storage components 248 may include a memory configured to store data or other information associated with message account 268, modules 262-266, and ML models 267 and 271.

One or more processors 240 may implement functionality and/or execute instructions associated with message system 260. Examples of processors 240 include application processors, display controllers, auxiliary processors, one or more sensor hubs, and any other hardware configure to function as a processor, a processing unit, or a processing device. Message account 268, modules 262-266, and ML models 267 and 271 may include instructions that are operable by processors 240 to perform various actions, operations, or functions of message system 260. For example, processors 240 may retrieve and execute instructions stored by storage components 248 that cause processors 240 to perform the operations described herein that are attributed to message account 268, modules 262-266, and ML models 267 and 271. The instructions, when executed by processors 240, may cause message system 260 to store information within storage components 248, for example, at message account 268.

Messaging service module 262 may include all functionality of messaging service module 162 of FIG. 1A and may perform similar operations as messaging service module 162 so as to configure message system 260 to provide a network based messaging service. Messaging service module 262 processes electronic messages received via a network, such as network 130. Messaging service module 262 maintains message account 268 which is associated with a user of computing device 110. Messages received by messaging service module 262 that are addressed to message account 268 are stored in inbox 269A of message account 268. Whereas messages received by messaging service module 262 that are sent from message account 268 are stored in sent box 269B. Copies of message account 268 may be replicated and stored locally at other computing devices, such as computing device 110. That is, for any action that messaging service module 262 performs on message account 268, messaging service module 262 may cause a client (such as messaging client module 122) to perform a similar action to a copy of messaging account 268 that stored elsewhere, and remote from message system 260.

Prediction module 264 may include all functionality of prediction module 164 of FIG. 1A and may perform similar operations as prediction module 164. Prediction module 264 automatically provide text suggestions during electronic message editing. Although shown and described as being part of a message system 260 which is a remote messaging system, some or all of prediction module 264 may reside locally at, and be executable from, a computing device, such as computing device 110 of FIG. 1A. As discussed above and in accordance with one or more techniques of this disclosure, prediction module 264 may refrain from providing text suggestions in an electronic message that is directed to a sensitive topic.

Topic module 266 may determine whether a message is directed to a sensitive topic. In some example, topic module 266 may parse the text of a current message to determine whether the current message include any words included on a list of sensitive topics. In some examples, topic module 166 may use a ML model, such as ML model 271, that is trained on sensitive vs non-sensitive messages to determine whether the current message is directed to a sensitive topic.

ML model 271 may be a machine-learned model (e.g., a neural network, a long-short-term memory model, or any other type of model). ML model 271 may develop rules or otherwise learn when a message is directed to a sensitive topic.

Topic module 266 may determine that a message is directed to a sensitive topic at any point. For instance, even if prediction module 264 already offered text suggestions for a particular electronic message at a first time, topic module 266 may determine that the particular electronic message is directed to a sensitive topic at a second time based on text entered by the user between the first time and the second time.

For electronic messages that are not directed to a sensitive topic, prediction module 264 may use ML model 267 to generate candidate portions of text. For instance, prediction module 264 may provide ML model 267 with a portion of text from a message currently being edited. Based on the provided portion of text, ML model 267 may generate one or more candidate portions of text predicted to follow the provided portion of text.

ML model 267 may be a machine-learned model (e.g., a neural network, a long-short-term memory model, or any other type of model). ML model 267 may develop rules or otherwise learn what text typically follow a starting or seed portion of text. With explicit permission previously obtained from users to make use of and analyze their electronic messages, the training corpus of text used to train ML model 267 may include the users' electronic messages. Message system 260 further provides a way for users to withdraw consent to make use of and analyze their electronic messages and in response, message system 260 stop analyzing the messages of those that withdraw consent.

While training ML model 267 using a larger corpus my yield more accurate predictions, certain text in the corpus may include user-specific fields. For instance, an email sent by user A may include user A's phone number "423-555-2133" in the context of "call me at 423-555-2133". Training ML model 267 to suggest a phone number after the text "call me at" may be desirable but the actual number suggested may be different for each user/situation.

In accordance with one or more techniques of this disclosure, when training ML model 267, prediction module 264 may replace certain portions of text (e.g., addresses, phone numbers, URLs, etc.) in the training corpus with corresponding tokens. As one example, when training ML model 267 on the text "my home address is 41341 Other Street, Woodbury, Minn., 55125", prediction module 264 may replace the text "41341 Other Street, Woodbury, Minn., 55125" with a token such as <<user_home_address>>. As another example, when training ML model 267 on the text "call me at 423-555-2133", prediction module 264 may replace the text "423-555-2133" with a token such as <<user_phone>>.

When predicting candidate portions of text in a message being edited by a particular user, prediction module 264 may replace tokens in the predicted text based on one or both of context of the electronic message or information about the particular user. For instance, after the particular user types "My address", ML model 267 may predict the text "is <<user_home_address>>" and replace the token <<user_home_address>> with the particular user's actual home address. As such, prediction module 264 may replace the token before the candidate text is displayed to the user.

Text typed by a user may include various spelling and/or grammatical errors. To improve the accuracy of the predicted text, prediction module 264 may perform spelling and/or grammar correction on text before providing the text to ML model 267 for prediction. In some examples, prediction module 264 may also perform spelling and/or grammar correction on text from the corpus being used to train ML model 267.

Figure 3:
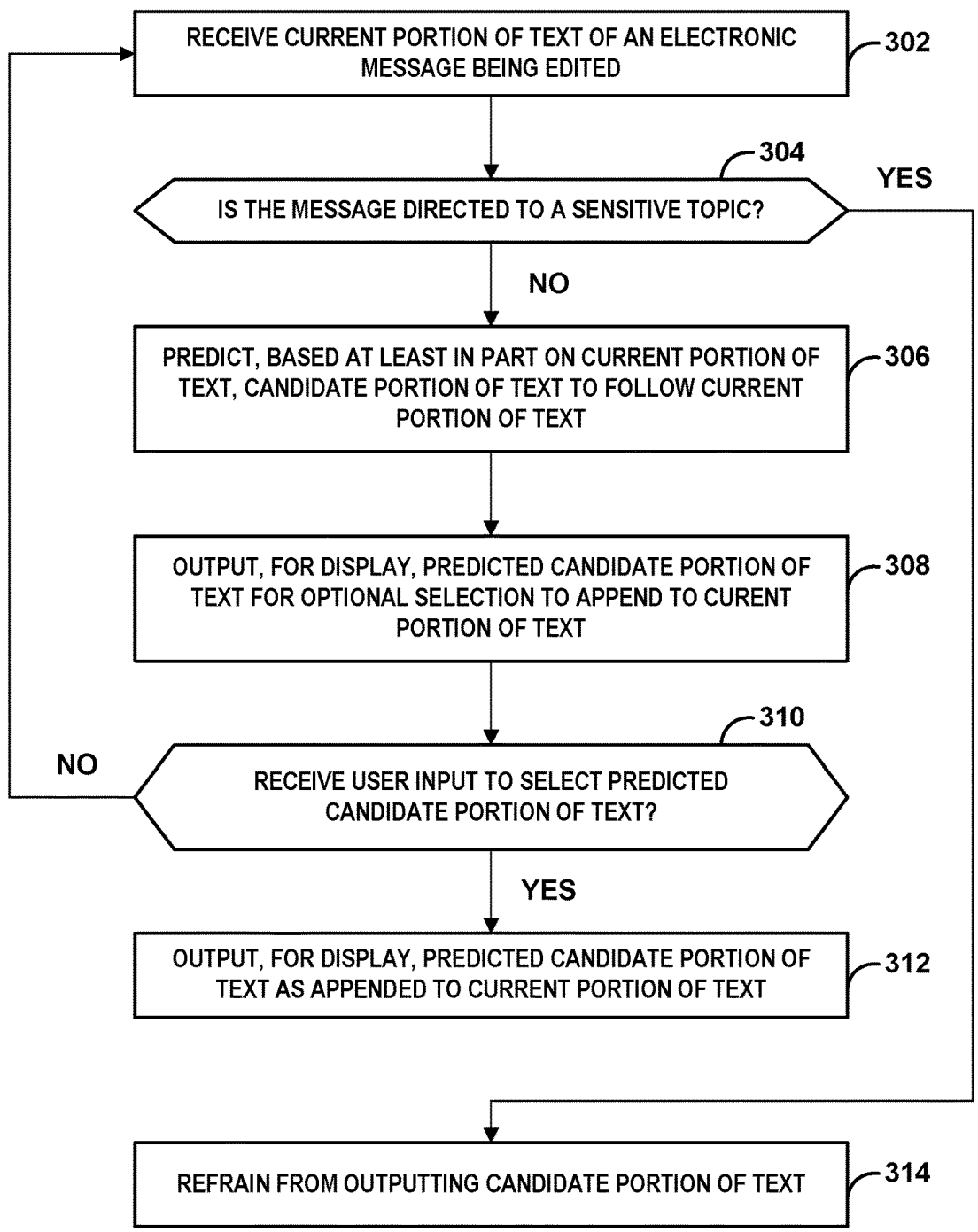
FIG. 3 is a flowchart illustrating example operations performed by an example computing system that is configured to selectively provide predicted text suggestions to a user editing an electronic message, in accordance with one or more aspects of the present disclosure.

FIG. 3 is a flowchart illustrating example operations performed by an example computing system that is configured to selectively provide predicted text suggestions to a user editing an electronic message, in accordance with one or more aspects of the present disclosure. FIG. 3 is described below in the context of system 100 of FIGS. 1A and 1B.

In accordance with techniques of this disclosure, system 100 may receive a current portion of text of an electronic message being edited (302). For example, messaging service module 262 may receive, from messaging client module 122, text provided by a user in a message currently being edited at user interface component 112.

System 100 may determine whether the message is directed to a sensitive topic (304). For instance, prediction module 164 may analyze the content of the message to determine whether the message is directed to a sensitive topic. As one example, topic module 266 of FIG. 2 may invoke machine learning module 271 to determine whether the message is directed to a sensitive topic.

If the message is directed to a sensitive topic (304, YES Branch), system 100 may refrain from outputting candidate portions of text (314). For instance, messaging client 122 may enable the user to continue editing the message without providing any suggested text. If however, the message is not directed to a sensitive topic (304, NO Branch), system 100 may predict, based at least in part on the current portion of text, a candidate portion of text to follow the current portion of text (306). For example, prediction module 164 may invoke a machine learning model (e.g., ML model 267 of FIG. 2) to generate one or more candidate portions of text to follow the current portion of text.

System 100 may output, for display, the predicted candidate portion of text for optional selection to append to the current portion of text (308). For instance, messaging client 122 may cause user interface component 112 to output user interface 113B that includes precited text "pe all is well" for optional selection to append at cursor 117.

System 100 may determine whether user input to select the predicted candidate portion of text (310). For instance, messaging client 122 may determine whether user interface component 122 has received user input to select the predicted candidate portion of text.

If system 100 receives user input to select the predicted candidate portion of text (310, YES branch), system 100 may output, for display, the predicted candidate portion of text as appended to the current portion of text (312). For instance, messaging client 122 may cause user interface component 112 to output user interface 113C that includes precited text "pe all is well" appended at the previous position of cursor 117. If system 100 does not receive user input to select the predicted candidate portion of text (310, NO branch), system 100 may repeat steps 302-310 with text subsequently provided by the user.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:

1. A method comprising:
receiving, by a computing system and at a first time, a first portion of text of a body of a first e-mail message being edited;
predicting, by the computing system and based on the first portion of text of the first e-mail message, a first candidate portion of text to follow the first portion of text of the first e-mail message;
outputting, for display at a second time, the predicted first candidate portion of text for optional selection to append to the first portion of text of the first e-mail message;
selectively appending, based on user input and at a third time, the predicted first candidate portion of text to the first portion of text of the first e-mail message;
determining, by the computing system and at a fourth time that is after the third time, whether the first e-mail message is directed to a sensitive topic based on a modification to the body of the first e-mail message performed between the third time and the fourth time, wherein determining whether the first e-mail message is directed to a sensitive topic comprises determining that the first e-mail message is directed to a sensitive topic using a machine learning model;
responsive to determining that the first e-mail message is directed to a sensitive topic, refraining from outputting subsequent candidate portions of text for optional selection to append to text in the first e-mail message;
responsive to determining that the first e-mail message is not directed to a sensitive topic, outputting, between the fourth time and a fifth time that is after the fourth time, subsequent candidate portions of text for optional selection to append to text in the first e-mail message;
sending, at the fifth time, the first e-mail message, wherein refraining from outputting subsequent candidate portions of text for optional selection to append to text in the first e-mail message comprises refraining, between the fourth time and the fifth time, from outputting subsequent candidate portions of text for optional selection to append to text in the first e-mail message;
receiving, by the computing system and at a sixth time that is after the fifth time, a first portion of text of a body of a second e-mail message being edited;
predicting, by the computing system and based on the first portion of text of the second e-mail message, a first candidate portion of text to follow the first portion of text of the second e-mail message; and
outputting, for display at a seventh time that is after the sixth time, the predicted first candidate portion of text for optional selection to append to the first portion of text of the second-email message.

2. The method of claim 1, wherein the machine learning model comprises a first machine learning model, and wherein predicting the first candidate portion of text for the first e-mail message comprises:
predicting, by the computing system and using a second machine learning model, one or more candidate portions of text to follow the first portion of text of the first e-mail message, the one or more candidate portions of text including the first candidate portion of text of the first e-mail message, wherein the first candidate portion of text of the first e-mail message includes a token; and
modifying the first candidate portion of text of the first e-mail message to generate a modified first candidate portion of text of the first e-mail message by replacing the token with text determined based on one or both of context of the first e-mail message or information about a user editing the first e-mail message,
wherein outputting the predicted first candidate portion of text for the first e-mail message comprises outputting, for display, the modified first candidate portion of text of the first e-mail message.

3. The method of claim 2, further comprising:
receiving a corpus of text;
modifying the corpus of text to generate a modified corpus of text by replacing fields in the corpus with corresponding tokens; and
training the second machine learning model using the modified corpus of text.

4. The method of claim 1, further comprising:
performing one or both of spelling or grammar correction on the first portion of text of the first e-mail message, wherein predicting the first candidate portion of text of the first e-mail message comprises:
predicting, based on the corrected first portion of text, the first candidate portion of text of the first e-mail message.

5. The method of claim 1, wherein sensitive topics include one or more of death, funeral, crime, job loss, job rejection, and academic rejection.

6. A computing system comprising:
one or more user interface components configured to receive typed user input; and
one or more processors configured to:
receive, by a computing system and at a first time, a first portion of text typed by a user in a body of a first e-mail message being edited;
predict, based on the first portion of text of the first e-mail message, a first candidate portion of text to follow the first portion of text of the first e-mail message;
output, for display at a second time, the predicted first candidate portion of text for optional selection to append to the first portion of text of the first e-mail message;
selectively append, based on user input and at a third time, the predicted first candidate portion of text to the first portion of text of the first e-mail message;
determine, at a fourth time that is after the third time and based on a modification to the body of the first e-mail message performed between the third time and the fourth time, whether the first e-mail message is directed to a sensitive topic, wherein, to determine whether the first e-mail message is directed to a sensitive topic, the one or more processors are configured to determine whether the first e-mail message is directed to a sensitive topic using a machine learning model;
responsive to determining that the first e-mail message is directed to a sensitive topic, refrain from outputting subsequent candidate portions of text for optional selection to append to text in the first e-mail message;
responsive to determining that the first e-mail message is not directed to a sensitive topic, output, between the fourth time and a fifth time that is after the fourth time, subsequent candidate portions of text for optional selection to append to text in the first e-mail message;
send, at the fifth time, the first e-mail message, wherein, to refrain from outputting subsequent candidate portions of text for optional selection to append to text in the first e-mail message, the one or more processors are configured to refrain, between the fourth time and the fifth time, from outputting subsequent candidate portions of text for optional selection to append to text in the first e-mail message;
receive, at a sixth time that is after the fifth time, a first portion of text of a body of a second e-mail message being edited;
predict, based on the first portion of text of the second e-mail message, a first candidate portion of text to follow the first portion of text of the second e-mail message; and
output, for display at a seventh time that is after the sixth time, the predicted first candidate portion of text for optional selection to append to the first portion of text of the second-email message.

7. The computing system of claim 6, wherein the machine learning model comprises a first machine learning model, and wherein, to predict the first candidate portion of text for the first e-mail message, the one or more processors are configured to:
predict, using a second machine learning model, one or more candidate portions of text to follow the first portion of text of the first e-mail message, the one or more candidate portions of text including the first candidate portion of text of the first e-mail message, wherein the first candidate portion of text of the first e-mail message includes a token; and
modify the first candidate portion of text of the first e-mail message to generate a modified first candidate portion of text of the first e-mail message by replacing the token with text determined based on one or both of context of the first e-mail message or information about a user editing the first e-mail message,
wherein, to output the predicted first candidate portion of text for the first e-mail message, the one or more processors are configured to output, for display, the modified first candidate portion of text of the first e-mail message.

8. The computing system of claim 7, wherein the one or more processors are further configured to:
receive a corpus of text;
modify the corpus of text to generate a modified corpus of text by replacing fields in the corpus with corresponding tokens; and
train the second machine learning model using the modified corpus of text.

9. The computing system of claim 6, wherein the one or more processors are further configured to:
perform one or both of spelling or grammar correction on the first portion of text of the first e-mail message, wherein predicting the first candidate portion of text of the first e-mail message comprises:
predict, based on the corrected first portion of text, the first candidate portion of text of the first e-mail message.

10. The computing system of claim 6, wherein sensitive topics include one or more of death, funeral, crime, job loss, job rejection, and academic rejection.

11. A computer-readable storage medium storing instructions that, when executed, cause one or more processors of a computing system to:
receive, at a first time, a first portion of text of a body of a first e-mail message being edited;
predict, based on the first portion of text of the first e-mail message, a first candidate portion of text to follow the first portion of text of the first e-mail message;
output, for display at a second time, the predicted first candidate portion of text for optional selection to append to the first portion of text of the first e-mail message;
selectively append, based on user input and at a third time, the predicted first candidate portion of text to the first portion of text of the first e-mail message;
determine, at a fourth time that is after the third time and based on a modification to the body of the first e-mail message performed between the third time and the fourth time, whether the first e-mail message is directed to a sensitive topic, wherein the instructions that cause the one or more processors to determine whether the first e-mail message is directed to a sensitive topic comprise instructions that cause the one or more processors to determine whether the first e-mail message is directed to a sensitive topic using a machine learning model;
responsive to determining that the first e-mail message is directed to a sensitive topic, refrain from outputting subsequent candidate portions of text for optional selection to append to text in first the e-mail message;

responsive to determining that the first e-mail message is not directed to a sensitive topic, output, between the fourth time and a fifth time that is after the fourth time, subsequent candidate portions of text for optional selection to append to text in the first e-mail message;

send, at the fifth time, the first e-mail message, wherein the instructions that cause the one or more processors to refrain from outputting subsequent candidate portions of text for optional selection to append to text in the first e-mail message comprise instructions that cause the one or more processors to refrain, between the fourth time and the fifth time, from outputting subsequent candidate portions of text for optional selection to append to text in the first e-mail message;

receive, at a sixth time that is after the fifth time, a first portion of text of a body of a second e-mail message being edited;

predict, based on the first portion of text of the second e-mail message, a first candidate portion of text to follow the first portion of text of the second e-mail message; and output, for display at a seventh time that is after the sixth time, the predicted first candidate portion of text for optional selection to append to the first portion of text of the second-email message.

12. The computer-readable storage medium of claim 11, wherein the machine learning model comprises a first machine learning model, and wherein the instructions that cause the one or more processors to predict the first candidate portion of text for the first e-mail message comprise instructions that cause the one or more processors to:

predict, using a second machine learning model, one or more candidate portions of text to follow the first portion of text of the first e-mail message, the one or more candidate portions of text including the first candidate portion of text of the first e-mail message, wherein the first candidate portion of text of the first e-mail message includes a token; and modify the first candidate portion of text of the first e-mail message to generate a modified first candidate portion of text of the first e-mail message by replacing the token with text determined based on one or both of context of the first e-mail message or information about a user editing the first e-mail message, wherein the instructions that cause the one or more processors to output the predicted first candidate portion of text for the first e-mail message comprise instructions that cause the one or more processors to output, for display, the modified first candidate portion of text of the first e-mail message.

13. The computer-readable storage medium of claim 12, further comprising instructions that cause the one or more processors to:

receive a corpus of text;

modify the corpus of text to generate a modified corpus of text by replacing fields in the corpus with corresponding tokens; and train the second machine learning model using the modified corpus of text.

14. The computer-readable storage medium of claim 11, further comprising instructions that cause the one or more processors to:

perform one or both of spelling or grammar correction on the first portion of text of the first e-mail message, wherein predicting the first candidate portion of text of the first e-mail message comprises:

predict, based on the corrected first portion of text, the first candidate portion of text of the first e-mail message.

15. The computer-readable storage medium of claim 11, wherein sensitive topics include one or more of death, funeral, crime, job loss, job rejection, and academic rejection.

* * * * *